(12) United States Patent
Dhanapal et al.

(10) Patent No.: US 11,628,653 B2
(45) Date of Patent: Apr. 18, 2023

(54) THERMALLY STABLE MULTILAYER POLYMER EXTRUSION

(71) Applicant: Engineered Profiles LLC, Columbus, OH (US)

(72) Inventors: Vickram Dhanapal, Delaware, OH (US); Brian Davis, Columbus, OH (US); Matthew Thomas Fenneman, Columbus, OH (US); Michael Kenneth Davis, Columbus, OH (US)

(73) Assignee: Engineered Profiles LLC, Columbus, OH (US)

( * ) Notice: Subject to any disclaimer, the term of this patent is extended or adjusted under 35 U.S.C. 154(b) by 0 days.

(21) Appl. No.: 16/831,898

(22) Filed: Mar. 27, 2020

(65) Prior Publication Data

US 2020/0307170 A1  Oct. 1, 2020

Related U.S. Application Data

(60) Provisional application No. 62/824,752, filed on Mar. 27, 2019.

(51) Int. Cl.
*B32B 27/08* (2006.01)
*B32B 27/06* (2006.01)
(Continued)

(52) U.S. Cl.
CPC ............ *B32B 27/08* (2013.01); *B32B 27/065* (2013.01); *B32B 27/20* (2013.01); *B32B 27/304* (2013.01);
(Continued)

(58) Field of Classification Search
None
See application file for complete search history.

(56) References Cited

U.S. PATENT DOCUMENTS

| 4,401,424 A | 8/1983 | De Zen |
| 5,288,218 A | 2/1994 | Melkonian |

(Continued)

FOREIGN PATENT DOCUMENTS

| CN | 103542186 A | 1/2014 |
| KR | 100877201 B1 | 1/2009 |
| WO | 2019165539 A1 | 9/2019 |

OTHER PUBLICATIONS

Omnexus, "HDT @0.46 Mpa (67 psi)", Heat Deflection Temperature (HDT) at 0.46 MPA (67 psi), Jan. 13, 2020, https://omnexus.specialchem.com/polymer-properties/properties/hdt-0-46-mpa-67-psi.

(Continued)

*Primary Examiner* — Michael C Miggins
(74) *Attorney, Agent, or Firm* — Standley Law Group LLP; Jeffrey Standley; Jeffrey Norris

(57) ABSTRACT

A combination of materials that may be formed through an extrusion process. The resulting product has at least two layers. By coextruding multiple layers of at least two types of materials together, the final product may have improved mechanical, thermal, electrical, and other properties as compared to the original materials used. Additionally, by using an additive, filler, or doping material in at least one layer of the final product during the extrusion process, the mechanical, thermal, electrical, or other properties of the final product may be further improved.

15 Claims, 22 Drawing Sheets

| Overall Thickness | 0.061 | 0.068 | 0.061 | 0.067 | 0.061 | 0.074 | 0.062 | 0.077 |
|---|---|---|---|---|---|---|---|---|
| Outer Core Material | PVC | PVC | PVC | PVC | PVC | PVC | PVC | PVC |
| Outer Core Material Theoretical CLTE (X10⁻⁵ in/in/°F) | 3.5 | 3.5 | 3.5 | 3.5 | 3.5 | 3.5 | 3.5 | 3.5 |
| Outer Core Thickness | 0.045 | 0.027 | 0.044 | 0.033 | 0.046 | 0.029 | 0.047 | 0.032 |
| Outer Core Thickness-% of Total | 74% | 40% | 72% | 48% | 74% | 40% | 75% | 42% |
| Inner Core Material | 20% GF PC | 20% GF PC | 30% GF PC | 30% GF PC | 40% GF PC | 40% GF PC | 50% GF PC | 50% GF PC |
| Inner Core Material Theoretical CLTE (X10⁻⁵ in/in/°F) | 1.5 | 1.5 | 1 | 1 | 0.9 | 0.9 | 0.8 | 0.8 |
| Inner Core Thickness | 0.016 | 0.041 | 0.017 | 0.035 | 0.016 | 0.044 | 0.015 | 0.045 |
| Inner Core Thickness-% of Total | 26% | 60% | 28% | 52% | 26% | 60% | 25% | 58% |
| Shrinkage (between 180°F and -20°F) | -0.058% | -0.041% | -0.066% | -0.033% | -0.074% | -0.017% | -0.066% | -0.016% |
| Shrinkage (between 200°F and -20°F) | -0.066% | -0.049% | -0.074% | -0.041% | -0.115% | -0.033% | -0.058% | -0.016% |
| Shrinkage (between 230°F and -20°F) | -0.082% | -0.058% | -0.139% | -0.049% | -0.115% | -0.041% | -0.066% | -0.025% |
| MCE Actual CLTE (X10⁻⁵ in/in/°F) | 2.744 | 2.065 | 2.765 | 2.127 | 2.599 | 1.793 | 2.200 | 1.304 |
| MCE Calculated CLTE (X10⁻⁵ in/in/°F) | 2.972 | 2.293 | 2.805 | 2.209 | 2.828 | 1.941 | 2.831 | 1.929 |
| % Difference in CLTE between Actual and Calculated | 8% | 11% | 1% | 4% | 9% | 8% | 29% | 48% |

(51) Int. Cl.
  *B32B 27/20* (2006.01)
  *B32B 27/32* (2006.01)
  *B32B 27/36* (2006.01)
  *B32B 27/30* (2006.01)
(52) U.S. Cl.
  CPC ............ *B32B 27/32* (2013.01); *B32B 27/365* (2013.01); *B32B 2266/0235* (2013.01)

(56) References Cited

U.S. PATENT DOCUMENTS

| | | | |
|---|---|---|---|
| 5,629,062 | A | 5/1997 | Ejiri et al. |
| 6,200,119 | B1 | 3/2001 | Pelto et al. |
| 6,394,782 | B1 | 5/2002 | Grassi |
| 6,855,402 | B2 | 2/2005 | Rabinovitch et al. |
| 8,065,848 | B2 | 11/2011 | Carlson et al. |
| 8,247,056 | B2 | 8/2012 | Hseih et al. |
| 8,517,248 | B2 | 8/2013 | Zaffino |
| 2001/0018078 | A1 | 8/2001 | Kossl |
| 2001/0043963 | A1 | 11/2001 | Zhang et al. |
| 2002/0160177 | A1 | 10/2002 | Warth et al. |
| 2004/0009338 | A1 | 1/2004 | Jo et al. |
| 2006/0141260 | A1* | 6/2006 | Haque ............... B32B 5/02 428/537.1 |
| 2007/0026179 | A1 | 2/2007 | de Boer et al. |
| 2008/0185065 | A1 | 8/2008 | Dreckotter et al. |
| 2010/0084037 | A1 | 4/2010 | Ericsson et al. |
| 2011/0223400 | A1 | 9/2011 | Li et al. |
| 2011/0250384 | A1* | 10/2011 | Sumi ............... B32B 3/30 428/118 |
| 2012/0175006 | A1 | 7/2012 | Frimel et al. |
| 2014/0037880 | A1 | 2/2014 | Siddhamalli et al. |
| 2014/0116563 | A1 | 5/2014 | Fernando et al. |
| 2014/0291886 | A1 | 10/2014 | Mark et al. |
| 2016/0009910 | A1* | 1/2016 | Crabb ............... B32B 27/365 428/215 |
| 2016/0200034 | A1* | 7/2016 | Quanshan ............ B29C 48/002 428/141 |
| 2016/0214548 | A1* | 7/2016 | Möller ............... B29C 44/1271 |
| 2017/0036376 | A1 | 2/2017 | Kurokawa et al. |
| 2017/0043518 | A1 | 2/2017 | Narayanaswamy |
| 2017/0173923 | A1 | 6/2017 | Davis et al. |
| 2017/0226355 | A1 | 8/2017 | Torfs et al. |
| 2017/0328651 | A1 | 11/2017 | Rozga et al. |
| 2017/0343136 | A1 | 11/2017 | Daugherty et al. |
| 2018/0194119 | A1* | 7/2018 | Mayer ............... B32B 27/08 |
| 2019/0144657 | A1* | 5/2019 | Henderson ........... B32B 27/308 359/539 |
| 2019/0152197 | A1* | 5/2019 | Zheng ............... B32B 27/20 |

OTHER PUBLICATIONS themoldingblog.com, site visited Jun. 4, 2018, http://www.themoldingblog.com/2017/02/17/sabic-seeks-patent-for-conformal-cooling-via-additive-manufacturing/.

Hölker, R. et al., Controlling Heat Balance in a Hot Aluminum Extrusion by Additive Manufactured Extrusion Dies with Conformal Cooling Channels, International Journal of Precision Engineering and Manufacturing, Aug. 8, 2013, pp. 1487-1493, vol. 14, No. 8.

Marques, S. et al., Design of Conformal Cooling for Plastic Injection Moulding by Heat Transfer Simulation, Polimeros, 2015, pp. 564-574.

* cited by examiner

| | | | | | | | | |
|---|---|---|---|---|---|---|---|---|
| Overall Thickness | 0.061 | 0.068 | 0.061 | 0.067 | 0.061 | 0.074 | 0.062 | 0.077 |
| Outer Core Material | PVC | PVC | PVC | PVC | PVC | PVC | PVC | PVC |
| Outer Core Material Theoretical CLTE (X10⁻⁵ in/in/°F) | 3.5 | 3.5 | 3.5 | 3.5 | 3.5 | 3.5 | 3.5 | 3.5 |
| Outer Core Thickness | 0.045 | 0.027 | 0.044 | 0.033 | 0.046 | 0.029 | 0.047 | 0.032 |
| Outer Core Thickness-% of Total | 74% | 40% | 72% | 48% | 74% | 40% | 75% | 42% |
| Inner Core Material | 20% GF PC | 20% GF PC | 30% GF PC | 30% GF PC | 40% GF PC | 40% GF PC | 50% GF PC | 50% GF PC |
| Inner Core Material Theoretical CLTE (X10⁻⁵ in/in/°F) | 1.5 | 1.5 | 1 | 1 | 0.9 | 0.9 | 0.8 | 0.8 |
| Inner Core Thickness | 0.016 | 0.041 | 0.017 | 0.035 | 0.016 | 0.044 | 0.015 | 0.045 |
| Inner Core Thickness-% of Total | 26% | 60% | 28% | 52% | 26% | 60% | 25% | 58% |
| Shrinkage (between 180°F and -20°F) | -0.058% | -0.041% | -0.066% | -0.033% | -0.074% | -0.017% | -0.066% | -0.016% |
| Shrinkage (between 200°F and -20°F) | -0.066% | -0.049% | -0.074% | -0.041% | -0.115% | -0.033% | -0.058% | -0.016% |
| Shrinkage (between 230°F and -20°F) | -0.082% | -0.058% | -0.139% | -0.049% | -0.115% | -0.041% | -0.066% | -0.025% |
| MCE Actual CLTE (X10⁻⁵ in/in/°F) | 2.744 | 2.065 | 2.765 | 2.127 | 2.599 | 1.793 | 2.200 | 1.304 |
| MCE Calculated CLTE (X10⁻⁵ in/in/°F) | 2.972 | 2.293 | 2.805 | 2.209 | 2.828 | 1.941 | 2.831 | 1.929 |
| % Difference in CLTE between Actual and Calculated | 8% | 11% | 1% | 4% | 9% | 8% | 29% | 48% |

FIG. 19

| Filler (%) | First Layer | Second Layer | Min. Temp. (°F) | Max. Temp. (°F) | 1'st Layer Thickness (%) | 2'nd Layer Thickness (%) | Length Shrinkage (%) |
|---|---|---|---|---|---|---|---|
| 0% | PVC | - | -20 | 200 | 100% | - | 2.211% |
| | | | -20 | 230 | 100% | - | 3.415% |
| 0% | CPVC | - | -20 | 200 | 100% | - | -0.680% |
| | | | -20 | 230 | 100% | - | -1.688% |

FIG. 20

| Filler (%) | First Layer | Second Layer | Min. Temp. (°F) | Max. Temp. (°F) | 1'st Layer Thickness (%) | 2'nd Layer Thickness (%) | Length Shrinkage (%) |
|---|---|---|---|---|---|---|---|
| 0% | PVC | PC | -20 | 200 | 37% | 63% | -0.166% |
|  |  |  | -20 | 200 | 71% | 29% | -0.274% |
|  |  |  | -20 | 230 | 45% | 55% | -0.191% |
|  |  |  | -20 | 230 | 72% | 28% | -0.291% |
| 10% | PVC | PC | -20 | 200 | 55% | 45% | -0.067% |
|  |  |  | -20 | 200 | 70% | 30% | -0.083% |
|  |  |  | -20 | 230 | 60% | 40% | -0.058% |
|  |  |  | -20 | 230 | 71% | 29% | -0.150% |
| 15% | PVC | PC | -20 | 200 | 58% | 42% | -0.058% |
|  |  |  | -20 | 200 | 77% | 23% | -0.083% |
|  |  |  | -20 | 230 | 57% | 43% | -0.067% |
|  |  |  | -20 | 230 | 70% | 30% | -0.067% |
| 20% | PVC | PC | -20 | 200 | 63% | 37% | -0.033% |
|  |  |  | -20 | 200 | 74% | 26% | -0.066% |
|  |  |  | -20 | 230 | 57% | 43% | -0.050% |
|  |  |  | -20 | 230 | 69% | 31% | -0.058% |
| 25% | PVC | PC | -20 | 200 | 56% | 44% | -0.066% |
|  |  |  | -20 | 200 | 73% | 27% | -0.058% |
|  |  |  | -20 | 230 | 61% | 39% | -0.017% |
|  |  |  | -20 | 230 | 76% | 24% | -0.058% |
| 30% | PVC | PC | -20 | 200 | 55% | 45% | -0.066% |
|  |  |  | -20 | 200 | 63% | 37% | -0.058% |
|  |  |  | -20 | 230 | 59% | 41% | -0.033% |
|  |  |  | -20 | 230 | 78% | 22% | -0.067% |

FIG. 21

| Filler (%) | First Layer | Second Layer | Min. Temp. (°F) | Max. Temp. (°F) | 1st Layer Thickness (%) | 2'nd Layer Thickness (%) | Length Shrinkage (%) |
|---|---|---|---|---|---|---|---|
| 10% | PVC | PC-ABS | -20 | 200 | 60% | 40% | -0.083% |
|  |  |  | -20 | 200 | 74% | 26% | -0.058% |
|  |  |  | -20 | 230 | 55% | 45% | -0.108% |
|  |  |  | -20 | 230 | 74% | 26% | -0.141% |
| 15% | PVC | PC-ABS | -20 | 200 | 60% | 40% | -0.050% |
|  |  |  | -20 | 200 | 74% | 26% | -0.066% |
|  |  |  | -20 | 230 | 56% | 44% | -0.050% |
|  |  |  | -20 | 230 | 77% | 23% | -0.125% |
| 20% | PVC | PC-ABS | -20 | 200 | 54% | 46% | -0.050% |
|  |  |  | -20 | 200 | 72% | 28% | -0.058% |
|  |  |  | -20 | 230 | 59% | 41% | -0.058% |
|  |  |  | -20 | 230 | 72% | 28% | -0.075% |
| 25% | PVC | PC-ABS | -20 | 200 | 56% | 44% | -0.033% |
|  |  |  | -20 | 200 | 71% | 29% | -0.066% |
|  |  |  | -20 | 230 | 58% | 42% | -0.033% |
|  |  |  | -20 | 230 | 69% | 31% | -0.075% |
| 30% | PVC | PC-ABS | -20 | 200 | 55% | 45% | -0.050% |
|  |  |  | -20 | 200 | 72% | 28% | -0.066% |
|  |  |  | -20 | 230 | 57% | 43% | -0.042% |
|  |  |  | -20 | 230 | 72% | 28% | -0.091% |

FIG. 22

THERMALLY STABLE MULTILAYER POLYMER EXTRUSION

This application claims the priority benefit of U.S. Provisional Application No. 62/824,752, filed Mar. 27, 2019, which is hereby incorporated by reference in its entirety.

BACKGROUND OF THE INVENTION

Coextrusion is the process of forming an extrudate comprised of more than one plastic melt stream. The process came about because some service demands, particularly from the packaging industry, could not be satisfied by a single polymer although they could be met by a combination of polymers. Coextrusion was first practiced in the production of cast film and is now also used in blown film and sheet extrusion. The intention is normally to produce a laminar structure in which each layer contributes a key property to the overall product performance, Coextruded films may be very complex structures comprised of many different functional layers, including tie layers whose purpose is to bond neighboring layers of limited compatibility.

Various components and materials have been used in the past for multi-layer, coextrusion of polymeric materials. This process is able to create composite materials with properties that are not found in a single material. Typically, a multilayer coextrusion process is employed to form sheets and film of polymeric materials having unique properties. Two or more diverse synthetic resinous materials may be simultaneously extruded from a single die opening to form a layered structure.

Besides being able to create very thin structures, coextrusion allows a large amount of the layered material to be produced rapidly and cost effectively. Furthermore, multi-layered structures with alternating mechanical, electrical, or optical properties can enable a variety of functional devices.

Additionally, the process of co-extrusion allows the addition of additives or fillers to the polymeric mixtures of one or multiple layers. These fillers are added to polymers to accomplish many different property changes and improvements. They can alter physical properties, reduce costs, trim weight, change the electrical conductivity, and enhance thermal properties, just to name a few. In almost every case they also have an effect on processing behavior during extrusion.

There have been numerous compositions that have been manufactured in an attempt to modify the coefficient of thermal expansion of the resultant composition. In these compositions, structures contain networks of fiber reinforcing materials that serve to constrain movement as a function of increasing temperature. The difficulty in most of the previous materials is that the processes used are a two-dimensional process that greatly limits the potential geometry of the finished article.

In other cases, molded polymers having constrained coefficient of thermal expansion properties have been produced using fibrous reinforcement. This method however is mostly impractical because molding operations require a flow pattern that results in orienting the fibers along the flow patterns within the mold thereby creating a large coefficient of thermal expansion wherein the finished part has a great differential in coefficient of thermal expansion properties within itself. Specifically, the coefficient of thermal expansion properties is reduced along the flow directions wherein the reinforcing fibers are aligned, but the coefficient of thermal expansion remains relatively large across the flow directions within the part.

Residential and commercial Window and door colors are getting darker by user preferences. Consequently, the heat buildup on some of the components on the exterior of the window and doors are getting upwards of 230 degrees Fahrenheit. Traditionally, chlorinated polyvinyl chloride may be a useful choice for some darker colors to maintain thermal stability because of the higher heat distortion temperature but as the window and door colors get to black and dark bronze, and designs are becoming more flat, chlorinated polyvinyl chloride may still not be preferable as it does not withstand the higher heats, for long periods of time.

As another example, refrigerated tractor trailers have support beams running through the length of the trailer that are currently made from foam polyvinyl chloride (PVC). The foam PVC may help to minimize cost. However, the part also needs a certain specific gravity (0.09 to 1.1) to withstand loads typically placed in a trailer.

SUMMARY OF THE INVENTION

An exemplary embodiment may address some or all of the shortcomings of the known art. An exemplary embodiment of the invention is a new combination of materials that may be formed through an extrusion process. The resulting product has at least two layers. By coextruding multiple layers of at least two types of materials together, the final product may have improved mechanical, thermal, electrical, and other properties as compared to the original materials used. Additionally, by using an additive, filler, or doping material in at least one layer (e.g., multiple or all layers) of the final product during the extrusion process, the mechanical, thermal, electrical, or other properties of the final product may be further improved. However, in some other exemplary embodiments, at least one layer may not comprise an additive, filler, or doping material.

In at least one exemplary embodiment, at least one layer may comprise polyvinyl chloride, high-density polyethylene, or other similar or suitable material. The second layer may comprise a polycarbonate, acrylic, acrylonitrile styrene acrylate, acrylonitrile butadiene acrylate, chlorinated polyvinyl chloride, or other similar or suitable material. For example, the second layer may have at least one additional filler, additive, or doping material mixed in with the polymeric material. Some types of filler material include, but are not limited to, glass, talc, fibrous material, chemicals, metals, other mineral fillers, and other organic or inorganic materials. Other materials or material layers may be used if desired and compatible with at least one of the aforementioned layers.

The filler, additive or doping materials may be of any material that is compatible with the material of the layer in which the filler is placed. Additionally, users may choose which filler, additive or doping materials to use based on the properties that will be enhanced or added to the final material. One or more filler material may be used.

In particular, it is desired that the fillers and materials selected be useful in improving the thermal stability of the final product. Thermal stability is a substance's resistance to permanent property changes caused solely by heat. Decomposition temperature is a commonly used metric to assess thermal stability.

Additionally, the final material may have improved heat deflection, improved thermal movement, improved surface finish, or improved impact resistance. The final material may be able to provide better structural stability, be produced at a lower cost and provide improved physical, electrical or other characteristics as needed.

In addition to the novel features and advantages mentioned above, other benefits will be readily apparent from the following descriptions of the drawings and exemplary embodiments.

BRIEF DESCRIPTION OF THE DRAWINGS

FIG. 19 is an exemplary chart of coefficient of linear thermal expansion and shrinkage for various embodiments of multilayer structures comprising a PVC layer and a glass-filled polycarbonate layer.

FIG. 20 is an exemplary chart of shrinkage of polyvinyl chloride and chlorinated polyvinyl chloride.

FIG. 21 is an exemplary chart of shrinkage of examples of multilayer extrusions comprising a polyvinyl chloride layer and polycarbonate layer.

FIG. 22 is an exemplary chart of shrinkage of examples of multilayer extrusions comprising a polyvinyl chloride layer and a polycarbonate-acrylonitrile butadiene styrene alloy composite.

DETAILED DESCRIPTION OF EXEMPLARY EMBODIMENTS

Figure 1:
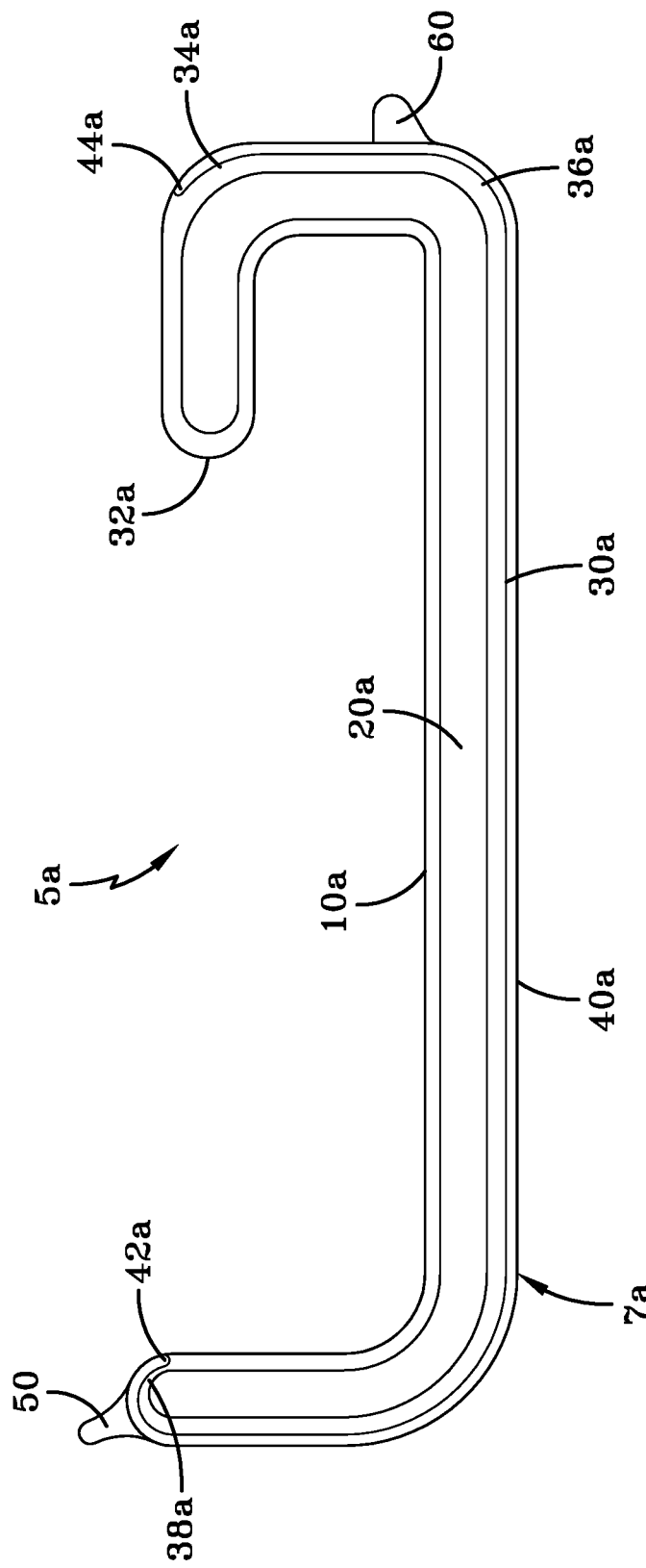
FIG. 1 is a side elevation view of one example of a final part that may be achieved by a coextrusion process.

This disclosure describes exemplary embodiments of a composite part that may be made from a co-extrusion process, wherein the final part may have improved thermal stability. Additionally, depending on the materials and fillers used, the part may have improved mechanical, chemical, electrical or other properties. A combination of materials may be used to achieve the desired properties. For example, a combination of materials may be chosen to reduce cost, while increasing thermal stability and other properties and also giving the final part a high-quality appearance.

The final part may comprise at least two layers of different materials. At least one layer may be a polymeric material, wherein a filler, additive or doping material may be included in the polymeric material. The part may typically be made by a known coextrusion process. However, other suitable manufacturing processes may be employed.

Various combinations of materials may be chosen depending on the conditions the final part is required to withstand and the mechanical, thermal, chemical or other properties the final part is required to have.

In an exemplary embodiment, the first layer may be a polymer, co-polymer, or other material having the desired characteristics. The first layer may be any material that is chemically compatible with or otherwise connectable to (e.g. a tie layer may be used) the polymeric material of a second layer. In an exemplary embodiment, the material in the first layer may be comprised of polyvinyl chloride (PVC), high-density polyethylene (HDPE), or other similar or suitable material. In another exemplary embodiment of a part having an overall thickness of 0.040 to 0.060 inches, the first layer may be 0.001 inches to 0.050 inches thick. More preferably, in such an embodiment, the first layer may be 0.005 inches to 0.030 inches thick and still more preferably the first layer may be 0.015 inches to 0.025 inches thick. In yet another exemplary embodiment having an overall thickness of 0.5 inches, the first layer may be 0.002 inches to 0.200 inches. Other exemplary embodiments may have other overall thicknesses, as well as first layers having other overall thicknesses, such as may be needed or beneficial for particular parts or uses.

The second layer may be a polymer, co-polymer, or other material that is chemically compatible with or otherwise connectable to the first layer. Additionally, the material of the second layer may include a filler, additive or doping material to create a composite material. In an exemplary embodiment, the main component of the second layer may typically be polycarbonate (PC), acrylic, acrylonitrile styrene acrylate (ASA), acrylonitrile butadiene acrylate (ABA), chlorinated polyvinyl chloride (CPVC), or other similar or suitable material.

While some examples of materials are mentioned above for the different layers, many other types of the materials may be implemented in various other embodiments. For example, standard plastics, engineering plastics, advanced engineering materials, and imidized materials may be used for any layer, which may be amorphous or crystalline materials, wherein the materials of adjacent layers may or may not be compatible. For instance, in the event of incompatible layers, a tie layer may be used to bond the adjacent layers together. In the progression from standard plastics, engineering plastics, advanced engineering materials, to imidized materials, the characteristics of the materials may generally transition from being: 1) general purpose, lower stress tolerance, good bonding, and good formability; 2) engineering or structural grade and good wear resistance; to 3) higher temperature resistance, higher steam resistance, higher wear resistance, and higher chemical resistance. Examples of standard plastics include, but are not limited to, polystyrene (PS), acrylonitrile butadiene styrene (ABS), PVC, polypropylene (PP), HDPE, and low-density polyethylene (LDPE). Examples of engineering plastics include, but are not limited to, polyphenylene oxide (PPO), acrylic, PC, acetal, polyoxymethylene (POM), polyethylene terephthalate (PTEP), ultra-high molecular weight polyethylene (UHMW PE), nylon, and polyamide (PA). Example of advance engineering materials include, but are not limited to, polysulfone (PSU), polyphenylsulfone (PPSU), polyetherimide (PEI), polyphenylene sulfide (PPS), polyetheretherketone (PEEK), and Polytetrafluoroethylene (PTFE). Lastly, examples of imidized materials include, but are not limited to, polyimide (PI), polybenzimidazole (PBI), and polyamide-imide (PAI). The particular materials used for each layer of a multilayer structure may be selected to achieve the desired physical characteristics. However, other factors may also factor into a selection of materials, such as material availability, material costs, manufacturability, etc.

As stated above, the first or second layer (or additional layers in other embodiments) may contain a filler, additive, or doping material that is designed to improve the thermal, electrical, chemical or other properties of the final part. A user may select the appropriate filler, additive or doping material and the concentration of that material based on the desired properties of the final part. The amount, and type, of filler added will depend on the physical or other properties that may be given to the final part. In an exemplary embodiment, the filler may be added in an amount from 10 wt. % to 45 wt. % of the weight of the second layer, and more preferably the amount of filler added may be in the amount of between 30 wt. % and 40 wt. % of the weight of the second layer. In yet another exemplary embodiment, the filler may be added in an amount from 0 wt. % to 70 wt. % of the weight of the second layer, and more preferably the amount of filler added may be in the amount of between 0.5 wt. % to 70 wt. % of the weight of the second layer. Other exemplary embodiments may have other filler content, such as may be needed or beneficial for particular parts or uses.

For example, a user may decide that the final part may need to have increased thermal stability. In this case, in addition to the thermal stability of the aforementioned polymer, a glass or fiber filler may be added to the first or second layer to further increase the thermal stability of the final part. The filler may be added to the polymeric material during the compounding or extrusion process and may be generally mixed into the polymer in a homogenous or non-homogenous manner. Talc, chemicals, metals, other mineral fillers, or other organic or inorganic fillers may also be used to increase the thermal stability (or other physical properties) either alone or in conjunction with glass or fibrous filler.

In another embodiment, the second layer may be 0.001 inches to 0.030 inches thick. More preferably, the second layer may be 0.008 inches to 0.025 inches thick, and still more preferably the second layer may be 0.012 inches to 0.018 inches thick. However, the thicknesses of the first and second layers may vary such as to account for the overall thickness of the product, the particular type of part or its uses, the particular materials, or other considerations. For example, in another embodiment having an overall thickness of 0.500 inches, the first layer may have a thickness of 0.100 to 0.480 inches, and the second layer may have a thickness of 0.020 to 0.400 inches. Additionally, the second layer may be more preferably comprised of an acrylonitrile butadiene acrylate and chlorinated polyvinyl chloride copolymer with a fibrous glass filler.

In addition to thermal stability, other fillers may be used either alone or in conjunction with other fillers to achieve other improvements in one or more properties. For example, if the final product needs improved electrical conductivity, aluminum powder, carbon fiber, or graphite may be used. If the final product needs improved structural strength, boron, carbon, carbon fiber, Kevlar™ or other fibrous materials may be used. For improved resistance to combustion the addition of chlorine, bromine, phosphorous, or metallic salts may be useful. Other additives and properties may be changed by the addition of other materials not mentioned herein, but generally known in the art.

Percentages of blends and combinations therein may vary from part to part as design requires (e.g., the amount of thermal stability or other material property that is needed per the end application).

In one example, polyvinyl chloride may be used as the first layer. Acrylonitrile styrene acrylate, an acrylonitrile butadiene acrylate (e.g. ABS), or polycarbonate copolymer blend may be used as a second layer. The second layer may contain glass or other filler in a homogenous mixture with the aforementioned polymer. In addition, a third layer comprising polyvinyl chloride may be added to the other side of the second layer. In one exemplary embodiment of a product that has an overall thickness of 0.060 inches, the first layer may be 0.001 inches to 0.050 inches thick. More preferably, in this example, the first layer may be 0.005 inches to 0.030 inches thick and still more preferably the first layer may be 0.015 inches to 0.025 inches thick. Other exemplary embodiments may have fewer or more layers, be comprised of different materials, or have different thicknesses, such as to account for a particular type of part or its uses, the particular materials, or other considerations.

In the above example, the polyvinyl chloride may act to smooth out a surface and form a thin decorative cap. Other exemplary embodiments may utilize other materials or layers to achieve a desirable surface (e.g., an aesthetically pleasing or durable surface).

For instance, in another exemplary embodiment, the final part may contain a fourth layer. In an exemplary embodiment of a product that has an overall thickness of 0.060 inches, this fourth layer may be an ultra-violet (UV) light protection layer. The UV protective layer may be 0.001 inches to 0.010 inches thick. More preferably, the UV protective layer may be 0.003 inches to 0.008 inches thick and still more preferably the UV protective layer may be 0.004 inches to 0.006 inches thick. Again, other exemplary embodiments may have fewer or more layers, be comprised of different materials, or have different thicknesses, such as to account for a particular type of part or its uses, the particular materials, or other considerations.

Turning now to the FIG. 1, which shows a side view of at least one part that may be formed by a coextrusion process. The part 5a comprises a first layer 10a, a second layer 20a, and a third layer 30a. In this example, the first layer 10a and third layer 30a may be polyvinyl chloride or high-density polyethylene. More specifically, the first and third layers may be approximately 0.020 inches thick and may comprise an interior grade rigid polyvinyl chloride. However, in this example, third layer 30a may also have portions 32a, 34a, and 36a that have increased thickness (e.g., at respective corners of part 5a that may be subject to more demands or forces when installed). The second layer 20a may be a polymer or copolymer blend with a filler material to enhance the chemical, electrical, mechanical or other physical properties of the final part. The second layer 20a may also be a composite that is coextruded with the first 10a and third 30a layers. An exemplary embodiment of the part may also have an optional fourth layer 40a that is an ultra-violet coating designed to protect the part from degradation due to exposure to light. In this example, the fourth layer 40a extends only partially around the part 5a, primarily around what may be referred to as the outer or visible portion 7a of part 5a when installed. More particularly, in this example, the fourth layer 40a terminates at an end portion 42a at or adjacent one corner of part 5a and at an end portion 44a at or adjacent another corner of part 5a. Additionally, in this example, end portion 42a interrupts and reduces the thickness of portion 38a of third layer 30a, whereas end portion 44a gradually decreases in thickness as it terminates. Furthermore, in this embodiment, the part may have attached additional elements or projections 50 and 60 that are used to allow the part to be connected to or interact with other parts. In this exemplary embodiment, the attached additional elements or projections 50 and 60 may be a soft polyvinyl chloride layer that serves as a seal or a friction fit into components that the part is being connected to. Other exemplary embodiments may utilize another soft or flexible material (e.g., an elastomer) for achieving a seal or a friction fit.

Figure 2:
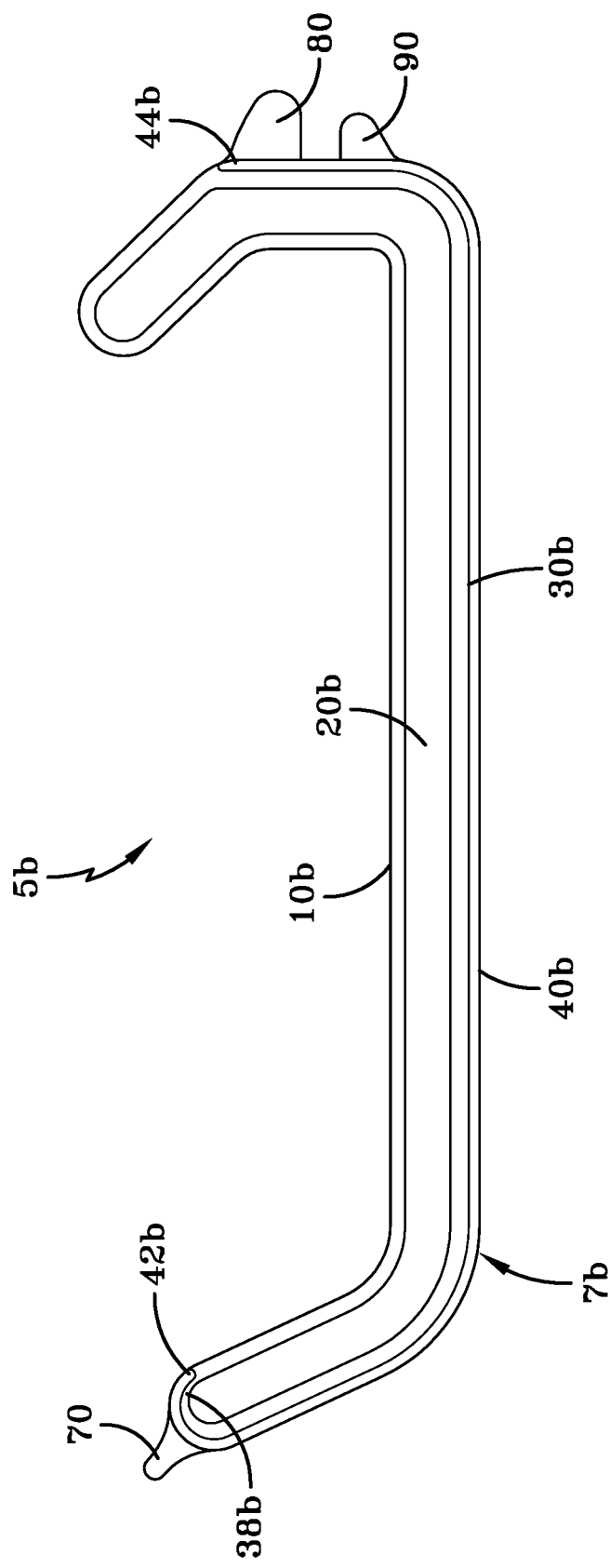
FIG. 2 is a side elevation view of a second example of a final part that may be achieved by a coextrusion process.

FIG. 2 shows a side view of an example of a second part 5b. This embodiment may be similar to the first embodiment. The part 5b comprises a first layer 10b, a second layer 20b, and a third layer 30b. In this example, the first layer 10b may be polyvinyl chloride or high-density polyurethane. The second layer 20b may be a polymer or copolymer blend with a filler material to enhance the chemical, electrical, mechanical or other physical properties of the final part. The second layer 20b may also be extruded with the first 10b and third 30b layers. An exemplary embodiment of the part may also have an optional fourth layer 40b that is an ultra-violet coating designed to protect the part from degradation due to exposure to light. In this example, the fourth layer 40b extends only partially around the part 5b, primarily around what may be referred to as the outer or visible portion 7b of part 5b when installed. More particularly, in this example, the fourth layer 40b terminates at an end portion 42b at or adjacent one corner of part 5b and at an end portion 44b at or adjacent another corner of part 5b. Additionally, in this example, end portion 42b interrupts and reduces the thickness of portion 38b of third layer 30b, whereas end portion 44b decreases in thickness as it terminates. Furthermore, in this embodiment, the part may have attached additional elements or projections 70, 80, and 90 that are used to allow the part to be connected to or interact with other parts. In this exemplary embodiment, the attached additional elements or projections 70, 80, and 90 may be a soft polyvinyl chloride layer that serves as a seal or a friction fit into components to which the part is being connected or with which it is interacting. Again, other exemplary embodiments may utilize another soft or flexible material (e.g., an elastomer) for achieving a seal or a friction fit.

Figure 3:
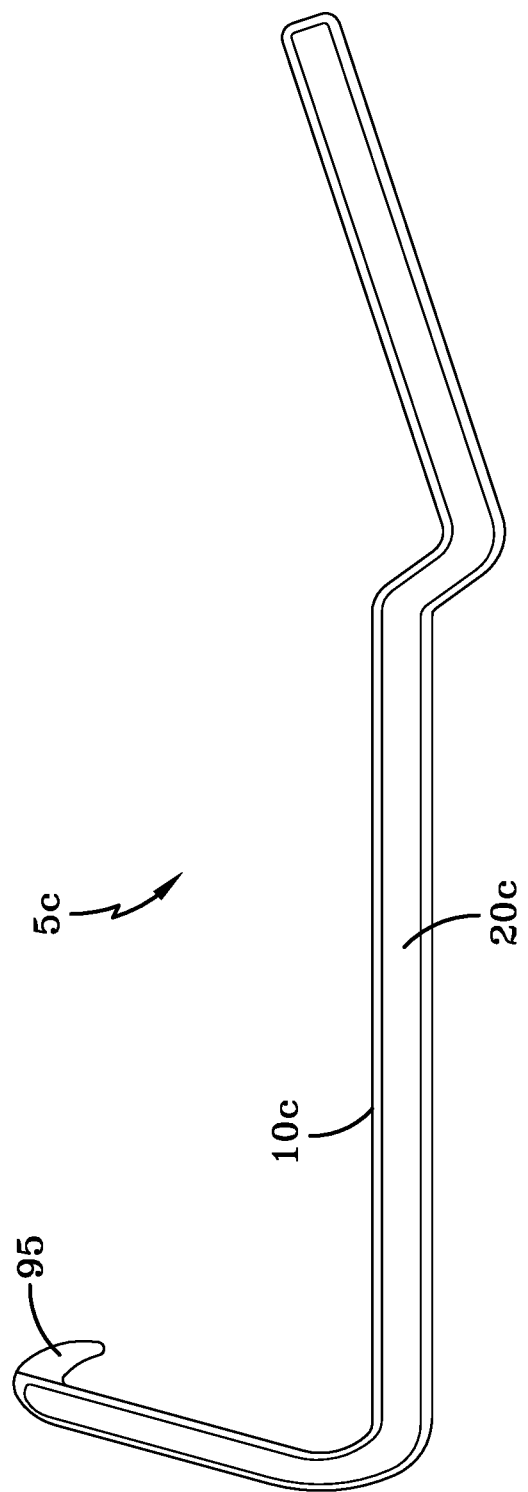
FIG. 3 is a side elevation view of a third example of a final part that may be achieved by a coextrusion process.

FIG. 3 shows a side view of a third part 5c that may be formed by the coextrusion process. In this example, the part 5c comprises an outer layer 10c, and an inner layer 20c. The inner layer 20c may be a polymer or copolymer blend with a filler material to enhance the chemical, electrical, mechanical or other physical properties of the final part. The inner layer 20c may be coextruded with the outer layer 10c. In this embodiment, the part 5c may have an additional element or projection 95 that is used to allow the part to be connected to other parts. In this embodiment, the attached additional element or projection 95 may be a soft polyvinyl chloride layer that serves as a seal or a friction fit into components that the part is being connected to. As before, other exemplary embodiments may utilize another soft or flexible material (e.g., an elastomer) for achieving a seal or a friction fit.

Figure 4:
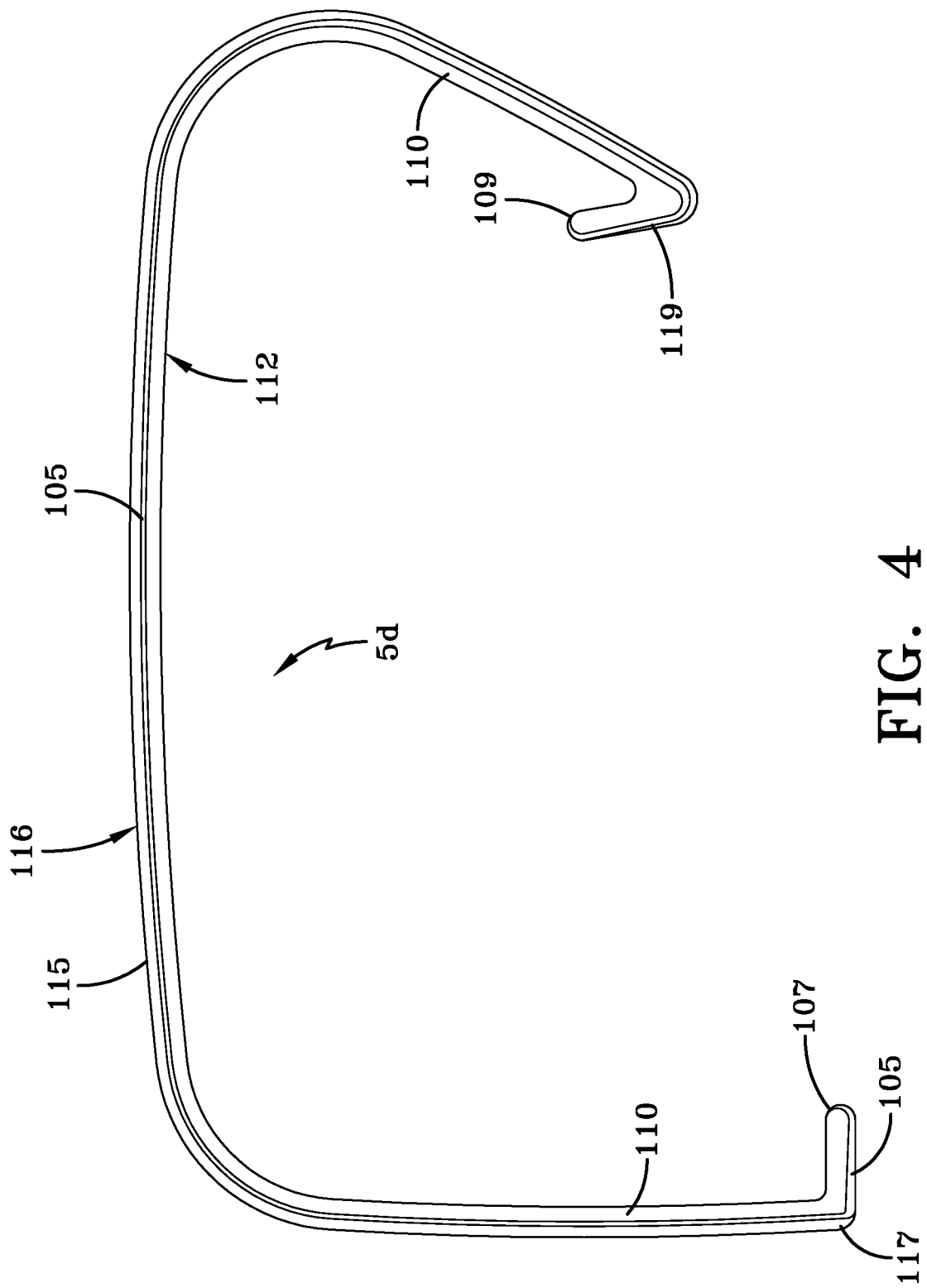
FIG. 4 is a side elevation view of a fourth example of a final part that may be achieved by a coextrusion process.

FIG. 4 shows a side view of an example of another part 5d that may be formed by a coextrusion process. In this example, the part 5d comprises a first layer 105, a second layer 110, and a third layer 115. In this example, the second layer 110 forms an inner surface 112 of part 5d. The first layer 105 terminates and gradually decreases in thickness at an end portion 107 at or adjacent one end of part 5d and at an end portion 109 at or adjacent an opposite end of part 5d. Additionally, in this example, the third layer 115 primarily forms an outer surface 116 of part 5d, which terminates and decreases in thickness at an end portion 117 at or adjacent one corner of part 5d and at an end portion 119 at or adjacent another corner of part 5d. The first layer may be comprised of either polyvinyl chloride or high-density polyethylene. The second layer 110 may be a polymer or copolymer blend with a filler material to enhance the chemical, electrical, mechanical or other physical properties of the final part. The third layer 115 may be a UV coating designed to protect the part from degradation due to exposure to light. Other exemplary embodiments may implement other suitable materials to protect against degradation due to light or weather.

Figure 5:
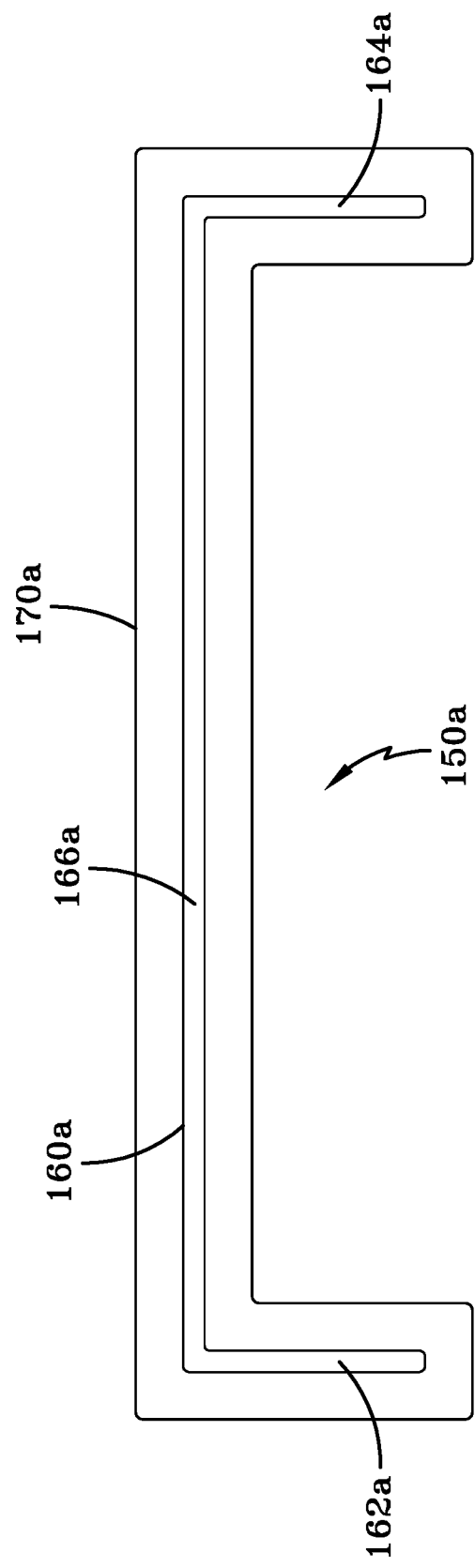
FIG. 5 is a side elevation view of a fifth example of a final part that may be achieved by a coextrusion process.
Figure 6:
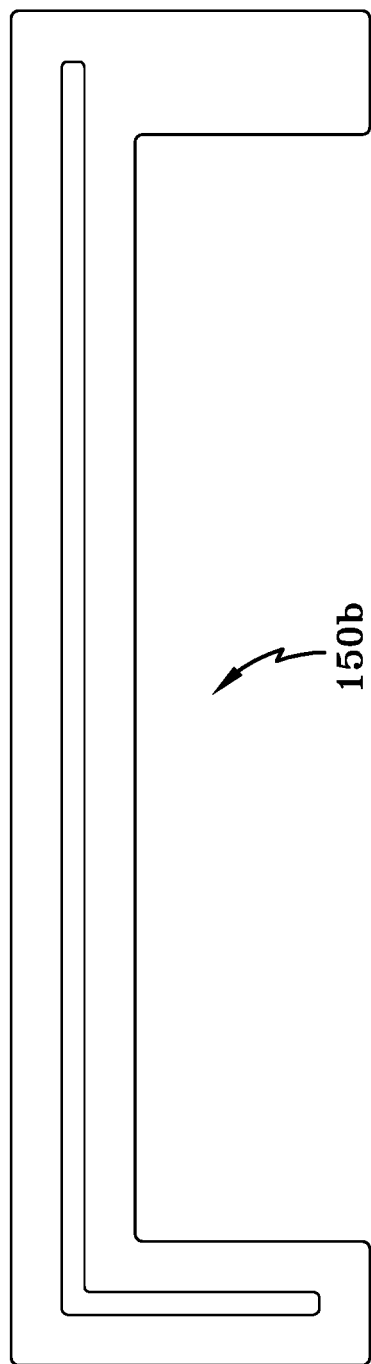
FIG. 6 is a side elevation view of a sixth example of a final part that may be achieved by a coextrusion process.

FIGS. 5-11 show various examples of parts that may be comprised of a foamed polymer exterior and at least one glass filled polymer core. While these or other exemplary embodiments may refer to examples of the use of glass filler, some examples of a core or other layer may not comprise any fillers or may comprise different or additional fillers. FIG. 5 shows an example of a part 150a in which a continuous glass filled polymer core 160a extends substantially through an entire length of a foamed polymer exterior 170a. More particularly, the continuous glass filled polymer core 160a extends substantially through an entire length of part 150a in this example. In addition, this embodiment of glass filled polymer core 160a may have opposing end portions 162a and 164a that are each thicker than and extend substantially orthogonally from a main portion 166a. FIG. 6 shows a part 150b that may be similar to part 150a except for the absence of end portion 164a.

Figure 7:
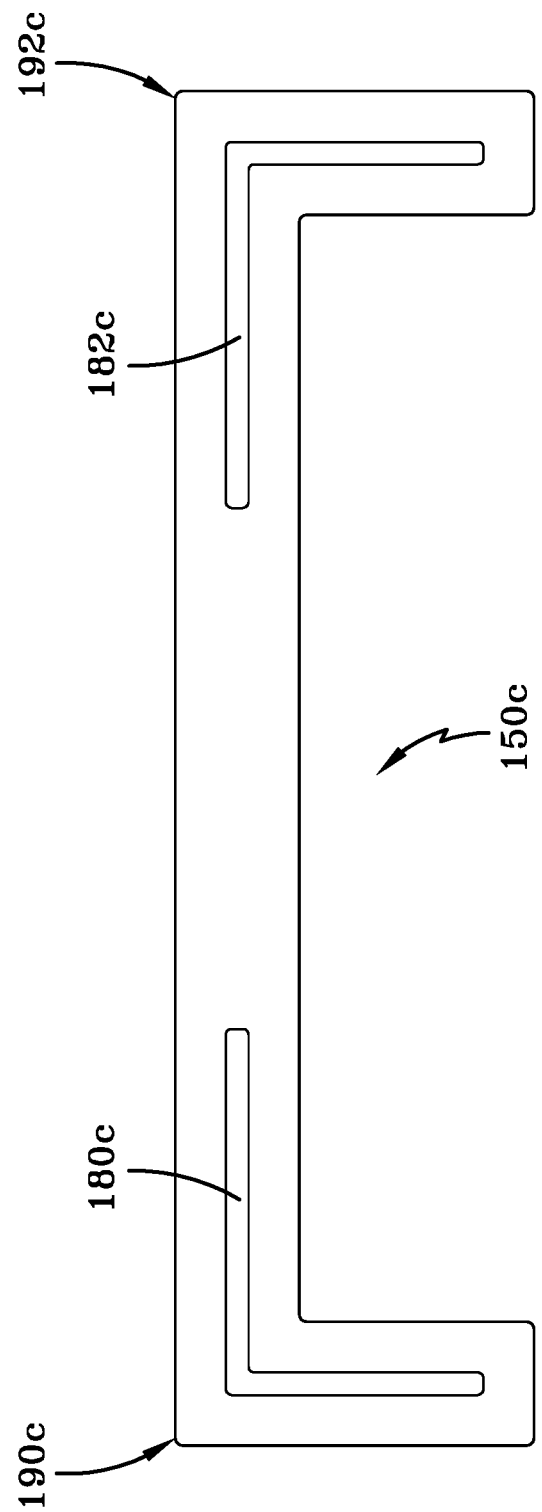
FIG. 7 is a side elevation view of a seventh example of a final part that may be achieved by a coextrusion process.

On the other hand, FIG. 7 shows an example of a part 150c that may be similar to part 150a except that that a main portion of the core layer is discontinuous. The localized segments may be useful for reinforcing or stabilizing particular areas of part 150c. In particular, part 150c is comprised of an L-shaped, glass filled polymer core segment 180c and an L-shaped, glass filled polymer core segment 182c, which are respectively situated about corners 190c and 192c of part 150c for enhanced stability and reinforcement.

Figure 8:
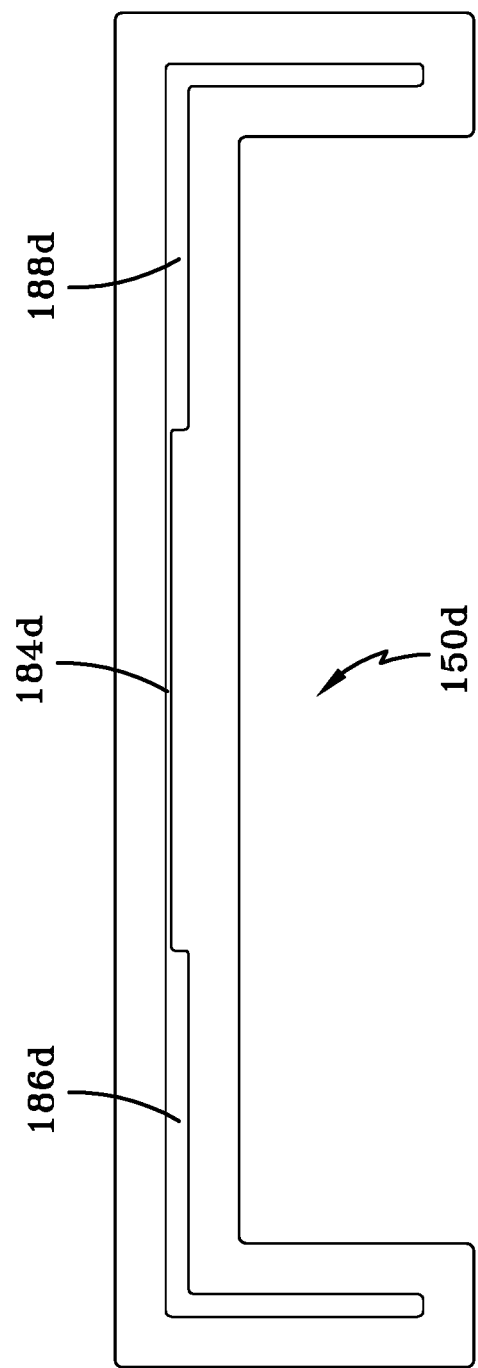
FIG. 8 is a side elevation view of an eighth example of a final part that may be achieved by a coextrusion process.

FIG. 8 shows an example of a part 150d that may be similar to part 150c except that a core bridge connects the L-shaped, glass filled polymer segments. In particular, part 150d comprises a core bridge 184d that connects the L-shaped, glass filled polymer segments. In this example, core bridge 184d is of reduced thickness (i.e., localized wall reduction) than the adjacent portions 186d and 188d of the core layer. However, in other exemplary embodiments, a core bridge may have increased thickness relative to the adjacent portions of a core layer in order to provide for increased stability or reinforcement through that area of the product.

Figure 9:
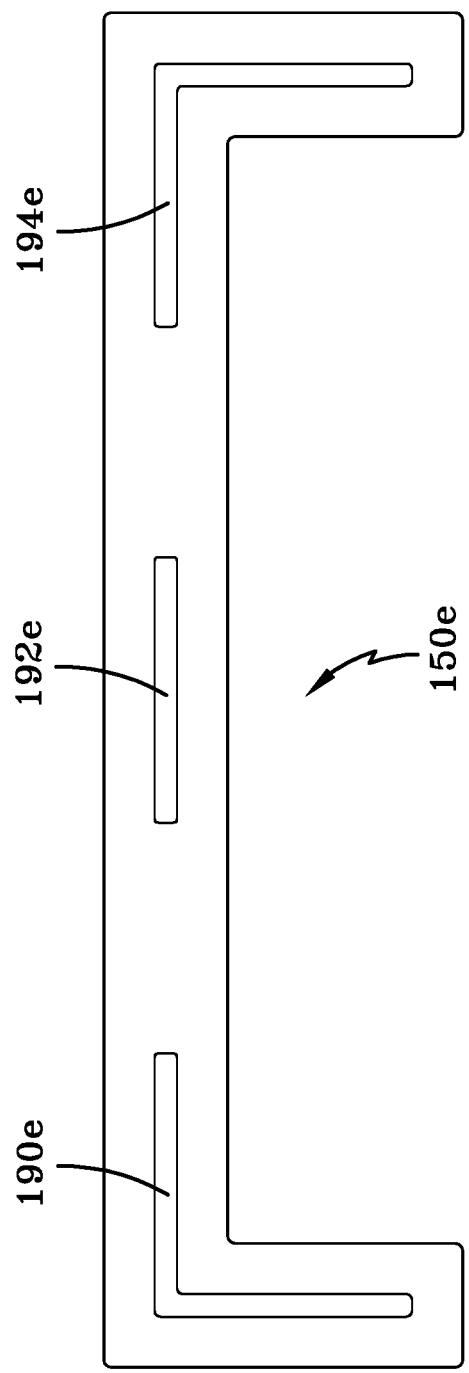
FIG. 9 is a side elevation view of a ninth example of a final part that may be achieved by a coextrusion process.

FIG. 9 shows an example of a part 150e that may be similar to part 150a except that a main portion of the core layer is discontinuous in multiple places. In this example, part 150e has a core in which a main portion is divided into localized core segments 190e, 192e, and 194e. For instance, the select placement of localized core segments may be useful for a variety of reasons including, but not limited to, localized stability or reinforcement, material availability or cost savings, the reception of mechanical hardware, etc.

Figure 10:
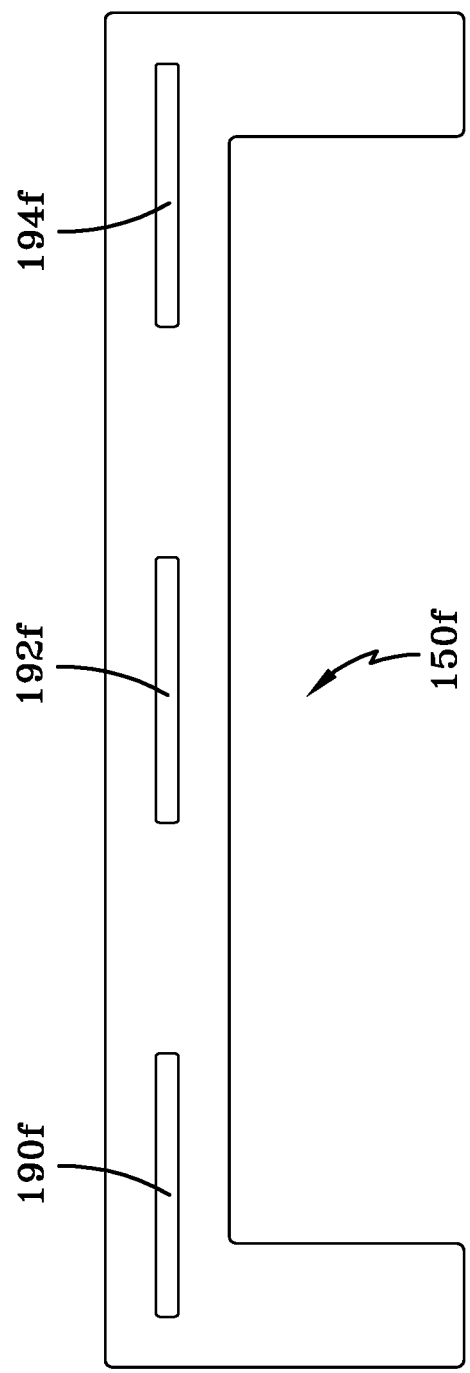
FIG. 10 is a side elevation view of a tenth example of a final part that may be achieved by a coextrusion process.

FIG. 10 shows an example of a part 150f that may be similar to part 150e except that the end portions of the core layer have been removed. Specifically, part 150f has a core that is only comprised of localized segments 190*f*, 192*f*, and 194*f*. While such segments are of substantially equivalent size and are substantially equivalently spaced in FIG. 10, other exemplary embodiments may have segments that are of different sizes or have different amounts of separation from an adjacent segment. The size and placement of a segment may vary in different embodiments for a variety of reasons including, but not limited to, localized stability or reinforcement, material availability or cost savings, the reception of mechanical hardware, etc.

Figure 11:
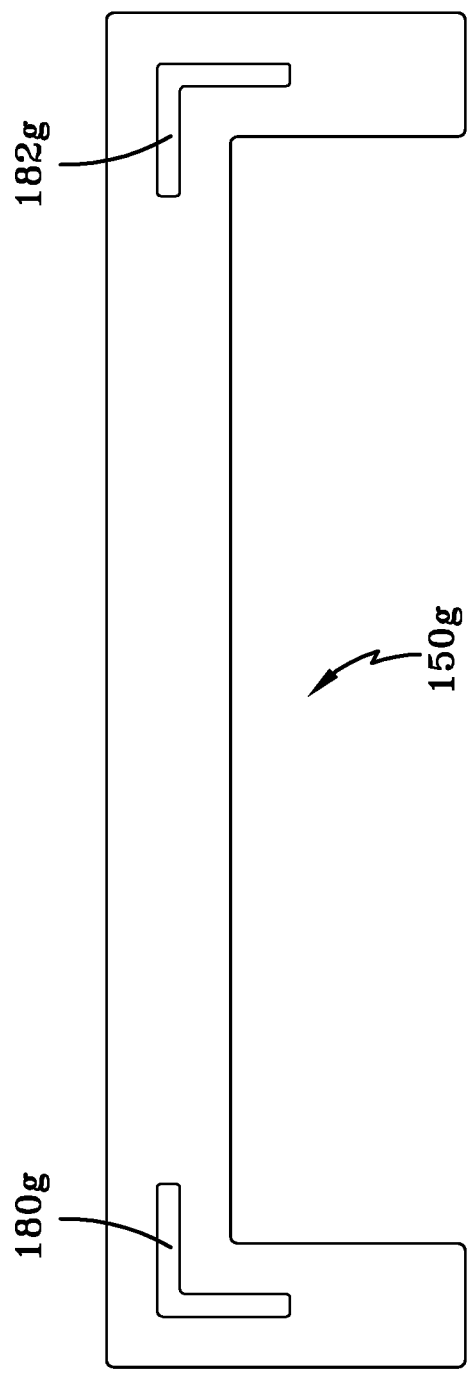
FIG. 11 is a side elevation view of an eleventh example of a final part that may be achieved by a coextrusion process.

In FIG. 11, part 150*g* may be similar to part 150*c* of FIG. 7. In this exemplary embodiment, the localized, L-shaped core segments 180*g* and 182*g* are of reduced size relative to the corresponding segments of FIG. 7. For example, the more localized (i.e., smaller) core segments of FIG. 11 may be sufficient for a particular part or its uses.

FIGS. 12-18 show examples of another type of part, wherein any of the aforementioned considerations may also apply. The exemplary parts of FIG. 12-18 may be comprised of a polymer substrate, at least one glass filled polymer core, and a polymer capping layer that extends at least partially around the exterior of the part.

Figure 12:
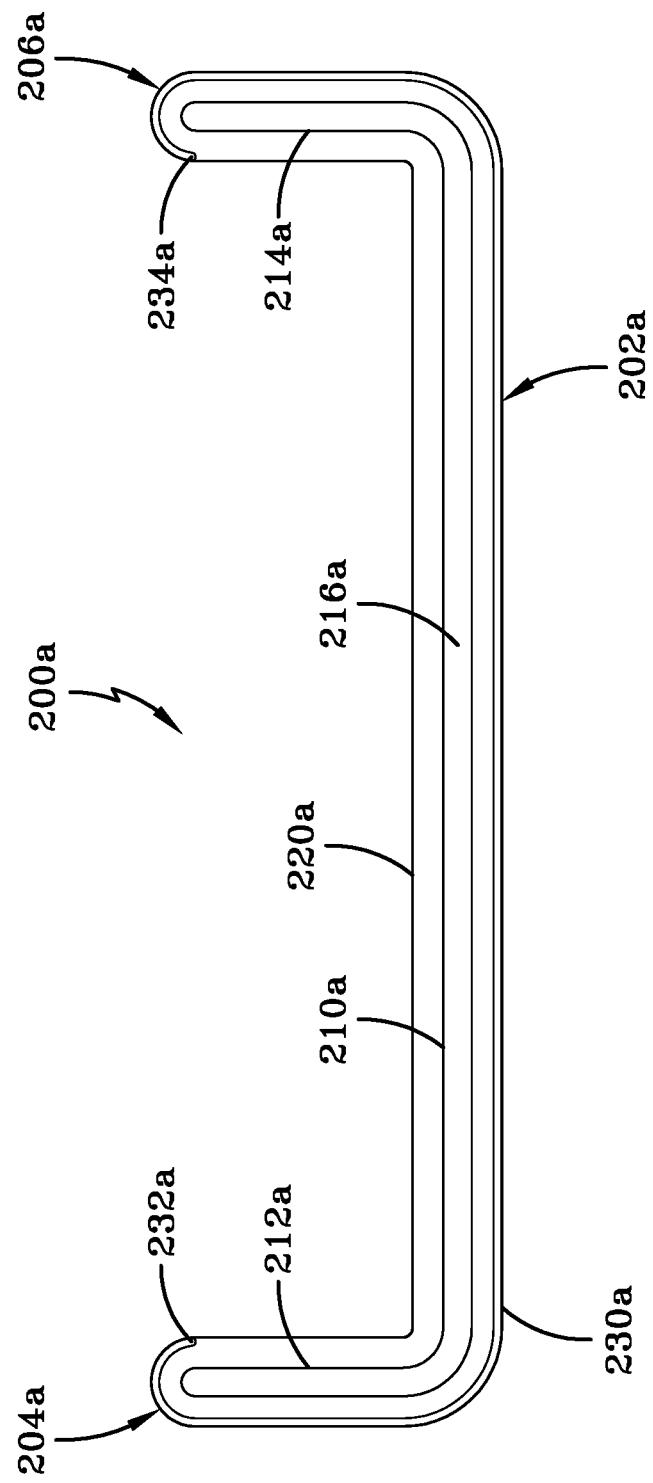
FIG. 12 is a side elevation view of a twelfth example of a final part that may be achieved by a coextrusion process.

FIG. 12 shows an example of a part 200*a* in which a continuous glass filled polymer core 210*a* extends substantially through an entire length of a polymer substrate 220*a*. More particularly, the continuous glass filled polymer core 210*a* extends substantially through an entire length of part 200*a* in this example. In addition, this embodiment of glass filled polymer core 210*a* may have opposing end portions 212*a* and 214*a* that extend substantially orthogonally from a main portion 216*a*. Furthermore, in this example, a polymer capping layer 230*a* extends partially around the part 200*a*, primarily around what may be referred to as the outer or visible portion 202*a* of part 200*a* when installed. More particularly, in this example, the polymer capping layer 230*a* terminates at an end portion 232*a* at or adjacent one corner 204*a* of part 200*a* and at an end portion 234*a* at or adjacent another corner 206*a* of part 200*a*. Additionally, in this example, the polymer capping layer 230*a* interrupts and reduces the thickness of polymer substrate 220*a* as compared to the portion of polymer substrate 220*a* that is not covered by polymer capping layer 230*a*. However, in other exemplary embodiments, a polymer capping layer may not impact a thickness of an underlying polymer substrate.

Figure 13:
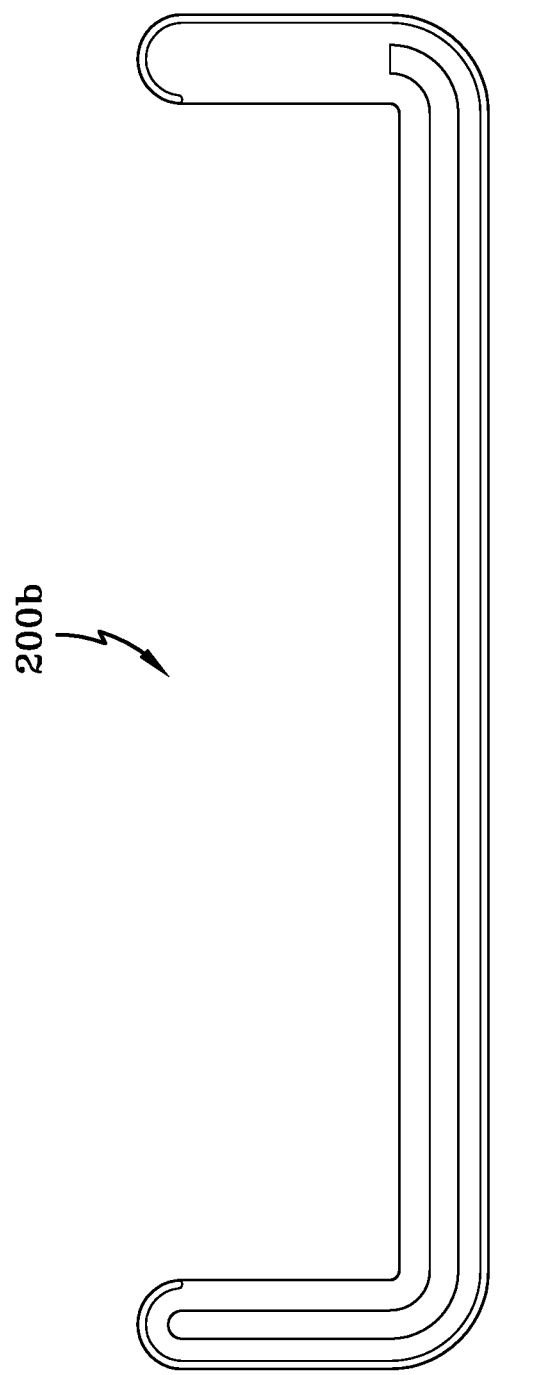
FIG. 13 is a side elevation view of a thirteenth example of a final part that may be achieved by a coextrusion process.

FIG. 13 shows a part 200*b* that may be similar to part 200*a* except for the absence of end portion 214*a*.

Figure 14:
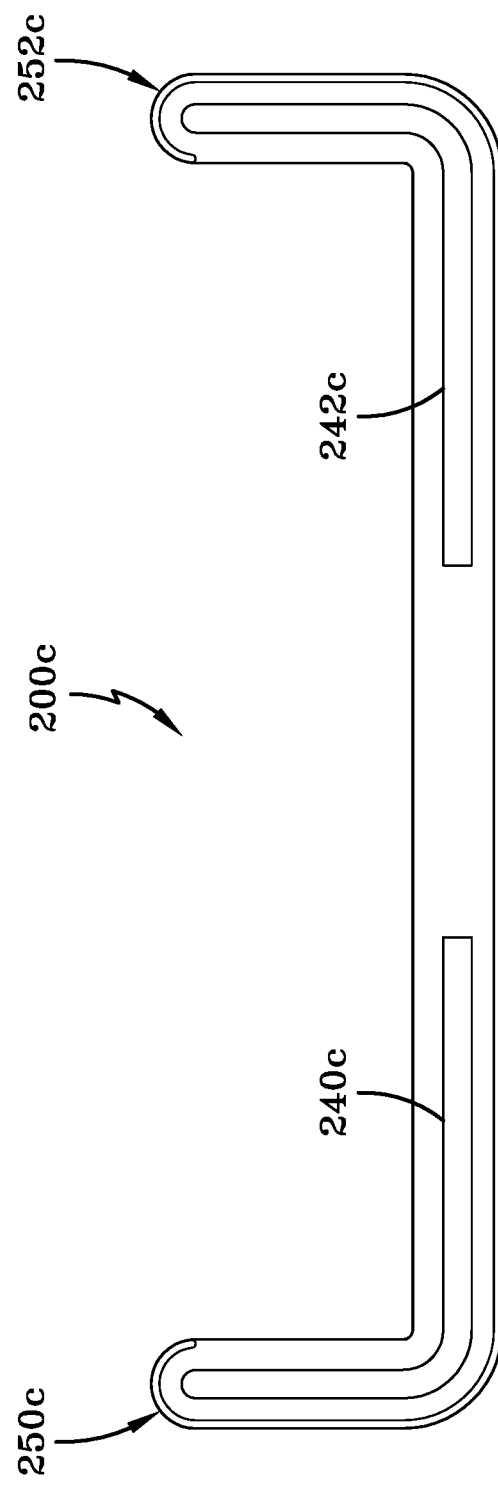
FIG. 14 is a side elevation view of a fourteenth example of a final part that may be achieved by a coextrusion process.

On the other hand, FIG. 14 shows an example of a part 200*c* that may be similar to part 200*a* except that that a main portion of the core layer is discontinuous. The localized segments may be useful for reinforcing or stabilizing particular areas of part 200*c*. In particular, part 200*c* is comprised of an L-shaped, glass filled polymer core segment 240*c* and an L-shaped, glass filled polymer core segment 242*c*, which are respectively situated about corners 250*c* and 252*c* of part 200*c* for enhanced stability and reinforcement.

Figure 15:
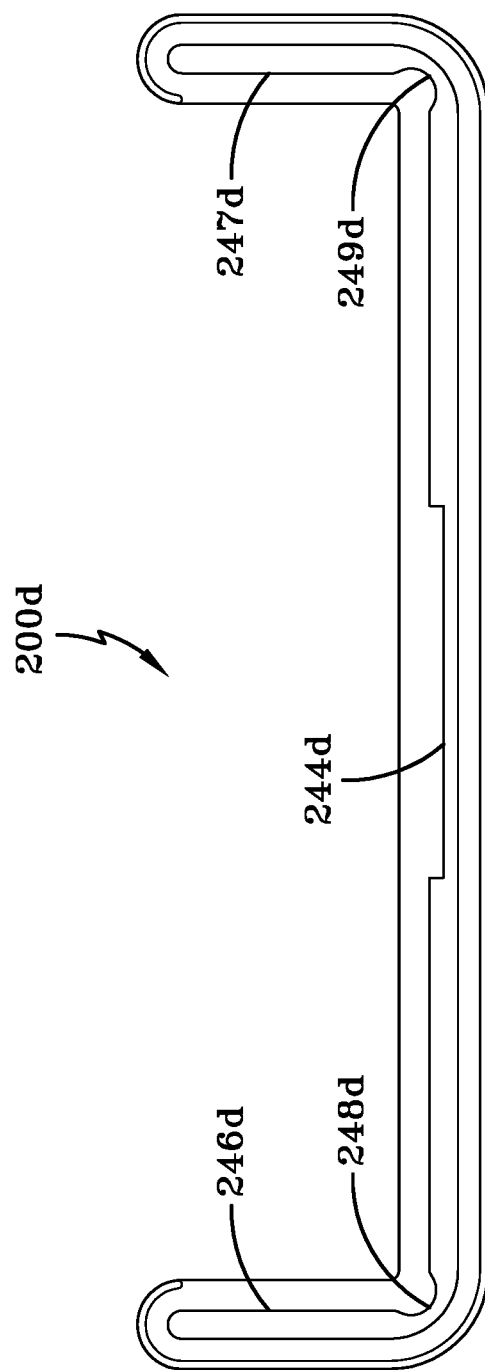
FIG. 15 is a side elevation view of a fifteenth example of a final part that may be achieved by a coextrusion process.

FIG. 15 shows an example of a part 200*d* that may be similar to part 200*c* except that a core bridge connects the L-shaped, glass filled polymer segments. In particular, part 200*d* comprises a core bridge 244*d* that connects the L-shaped, glass filled polymer segments. In this example, core bridge 244*d* is of reduced thickness (i.e., localized wall reduction) than the adjacent portions 246*d* and 247*d* of the core layer. However, in other exemplary embodiments, a core bridge may have increased thickness relative to the adjacent portions of a core layer in order to provide for increased stability or reinforcement through that area of the product. Additionally, in this example, portion 246*d* has a notched corner 248*d*, and portion 247*d* has a notched corner 249*d*, wherein a notched corner or other area of reduced thickness may be useful for various reasons including, but not limited to, increased flexibility in that area, reduced need for localized stability or reinforcement in that area, material availability considerations, material cost considerations, etc.

Figure 16:
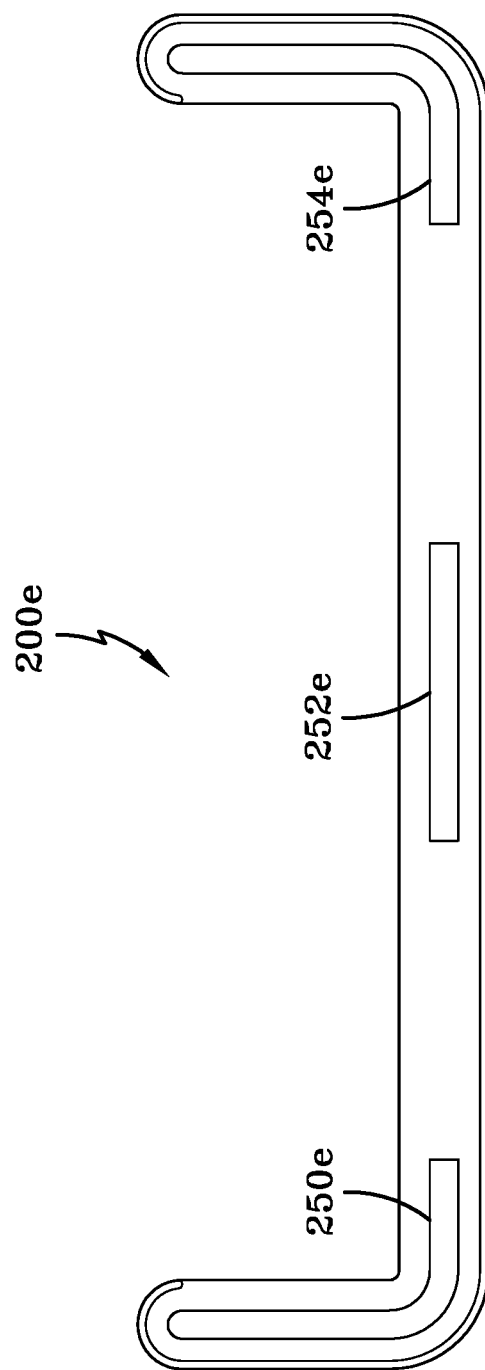
FIG. 16 is a side elevation view of a sixteenth example of a final part that may be achieved by a coextrusion process.

FIG. 16 shows an example of a part 200*e* that may be similar to part 200*a* except that a main portion of the core layer is discontinuous in multiple places. In this example, part 200*e* has a core in which a main portion is divided into localized core segments 250*e*, 252*e*, and 254*e*. For instance, the select placement of localized core segments may be useful for a variety of reasons including, but not limited to, localized stability or reinforcement, material availability or cost savings, the reception of mechanical hardware, etc.

Figure 17:
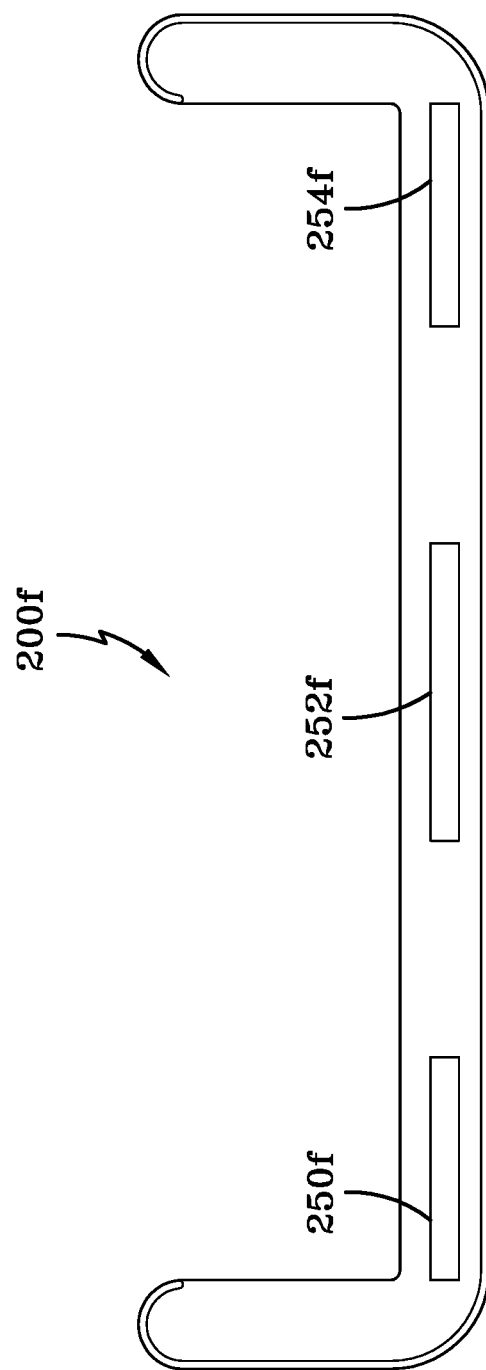
FIG. 17 is a side elevation view of a seventeenth example of a final part that may be achieved by a coextrusion process.

FIG. 17 shows an example of a part 200*f* that has a core that is only comprised of localized segments 250*f*, 252*f*, and 254*f*. While such segments are of similar size and are substantially equivalently spaced in FIG. 17, other exemplary embodiments may have segments that are of different sizes or have different amounts of separation from an adjacent segment. The size and placement of a segment may vary in different embodiments for a variety of reasons including, but not limited to, localized stability or reinforcement, material availability or cost savings, the reception of mechanical hardware, etc.

Figure 18:
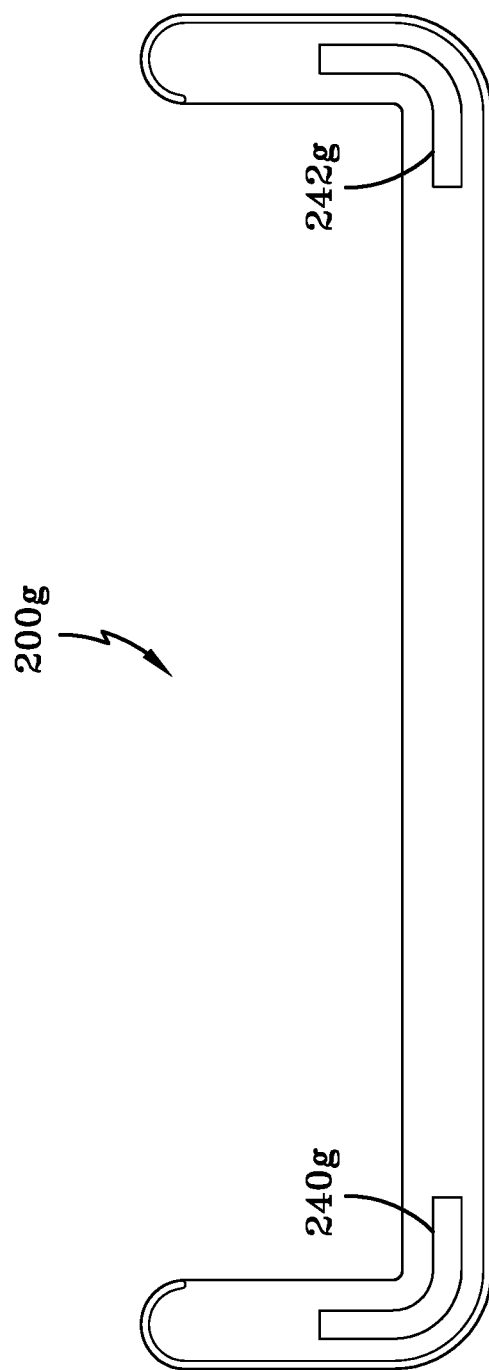
FIG. 18 is a side elevation view of an eighteenth example of a final part that may be achieved by a coextrusion process.

In FIG. 18, part 200*g* may be similar to part 200*c* of FIG. 14. In this exemplary embodiment, the localized, L-shaped core segments 240*g* and 242*g* are of reduced size relative to the corresponding segments of FIG. 14. For example, the more localized (i.e., smaller) core segments of FIG. 18 may be sufficient for a particular part or its uses. Regarding the aforementioned examples, other exemplary embodiments may utilize other suitable materials, layers, thicknesses, and termination points (if any) such as may be needed or beneficial for a particular part or its uses, physical properties, material availability, cost considerations, or other factors. Such as addressed above, it should be noted that these material combinations may not always be homogeneously, continuously, or consistently blended or provided throughout the part. For example, while a homogenous blend may be used for the thermally stable layer, a layer may be distinct from other layers that may serve as legs, connectors, or capstocks in the final part. Furthermore, one or more thermally stable layers may be co-extruded within the final part to create more thermally stable areas of a final part, or a completely thermally stable part up to the temperatures the thermally stable part is designed to perform best under.

FIG. 19 is a chart of coefficient of linear thermal expansion (CLTE) and shrinkage for examples of multilayer core extrusions (MCE) comprised of various materials. In particular, each example comprised an outer core of PVC and an inner core of a glass filled polycarbonate (PC) composite. The chart provides examples of how CLTE and shrinkage may be improved by changes in the thicknesses of the layers and/or in the content of the inner core material. Although not addressed in this example, changes in the outer core material would also impact CLTE and shrinkage.

The charts of FIGS. 20-22 address shrinkage of other examples of structures. FIG. 20 first compares shrinkage of only a PVC layer or a CPVC layer at different temperatures. FIG. 21 addresses shrinkage of multilayer core extrusions comprising a PVC layer and a PC layer at different amounts of filler content in the PC layer, different temperatures, and different layer thicknesses. For further comparison, FIG. 22 considers similar factors that affect shrinkage of multilayer core extrusions comprising a PVC layer and a PC-ABS alloy composite. Again, among other factors, filler content, layer thicknesses, and temperature variations may be varied to individually or collectively impact the physical characteristics (e.g., shrinkage or CLTE) of a component.

In one exemplary embodiment, the final product may be used as a glazing for windows or doors. In this embodiment, the second layer may comprise an approximately 0.015 inches thick glass filled ABS or polycarbonate composite. Additionally, this embodiment may have a first layer that may be an approximately 0.040 inches thick layer of PVC. This combination has the potential to generate an improved thermal stability, improved impact resistance, and improved appearance while simultaneously decreasing the cost of the part. Achieving these results is not possible with a pure PVC or CPVC part.

In another embodiment, support structures may be made stronger by adding an internal layer that is made out of a glass filled material (e.g. a glass filled PVC composite). By using a glass filled PVC composite, the final parts used in the support structure may be produced with a specific gravity as low as 0.5, thereby reducing the weight of the trailer, while still meeting structural requirements.

While the product presented herein has been described with reference to various embodiments, those skilled in the art will understand that various changes may be made and equivalents may be substituted for elements thereof without departing from the scope and essence of the disclosure. In addition, many modifications may be made to adapt a particular situation or material to the teachings of the disclosure without departing from the essential scope thereof. Therefore, it is intended that the product presented herein not be limited to the particular embodiments disclosed. Also, all citations referred to herein are expressly incorporated herein by reference.

What is claimed is:

1. A multilayer structure consisting essentially of:
   a first layer consisting essentially of polyvinyl chloride; and
   a second layer formed on at least one side of the first layer, wherein the second layer is a composite material consisting essentially of a homogenous blend of polycarbonate and glass filler;
   wherein said multilayer structure has improved thermal stability as compared to a similar structure except without said second layer, wherein said improved thermal stability is adapted to result in a higher heat deflection temperature, a lower coefficient of linear thermal expansion, and decreased shrinkage.

2. The multilayer structure of claim 1 wherein a third layer is an ultraviolet protection layer.

3. The multilayer structure of claim 1 wherein:
   at least one of the first layer and the second layer has an additional filler, additive, or doping material; and
   the additional filler, additive, or doping material is selected to improve the physical, chemical, or electrical properties of the multilayer structure.

4. The multilayer structure of claim 1 wherein the multilayer structure is configured to conform to an external structure or equipment.

5. The multilayer structure of claim 1 wherein the second layer is separated into multiple localized segments.

6. The multilayer structure of claim 1 wherein the first layer comprises foamed polyvinyl chloride.

7. The multilayer structure of claim 1 wherein the first layer has a filler, additive, or doping material wherein the filler, additive, or doping material is selected to improve the thermal stability of the multilayer structure.

8. The multilayer structure of claim 1, wherein the composite material has an additional filler, additive, or doping material wherein the additional filler, additive, or doping material is selected to improve the physical, chemical, or electrical properties of the multilayer structure.

9. The multilayer structure of claim 8 wherein the additional filler is adapted to improve the electrical conductivity of the multilayer structure.

10. The multilayer structure of claim 9 wherein the additional filler is either aluminum powder, carbon fiber, or graphite.

11. The multilayer structure of claim 8 wherein the second layer is adapted to improve the structural strength of the multilayer structure.

12. The multilayer structure of claim 11 wherein the second layer has an additional filler that is selected from the group consisting of Kevlar™, carbon, boron, carbon fiber, or combinations thereof.

13. The multilayer structure of claim 8 wherein:
    the additional filler is selected from the group consisting of talc, fibrous material, chemicals, metals, other mineral fillers, or combinations thereof.

14. The multilayer structure of claim 1, wherein a third layer is on a second side of the second layer opposite the first layer, the third layer comprising polyvinyl chloride.

15. The multilayer structure of claim 14 wherein a fourth layer is an ultraviolet protection layer.

* * * * *